O. W. HINER, D. C. FARNHAM AND E. A. FARNHAM, Jr.
AUTOMATIC ANIMAL FEEDER.
APPLICATION FILED SEPT. 23, 1919.
1,346,027.
Patented July 6, 1920.
2 SHEETS—SHEET 1.
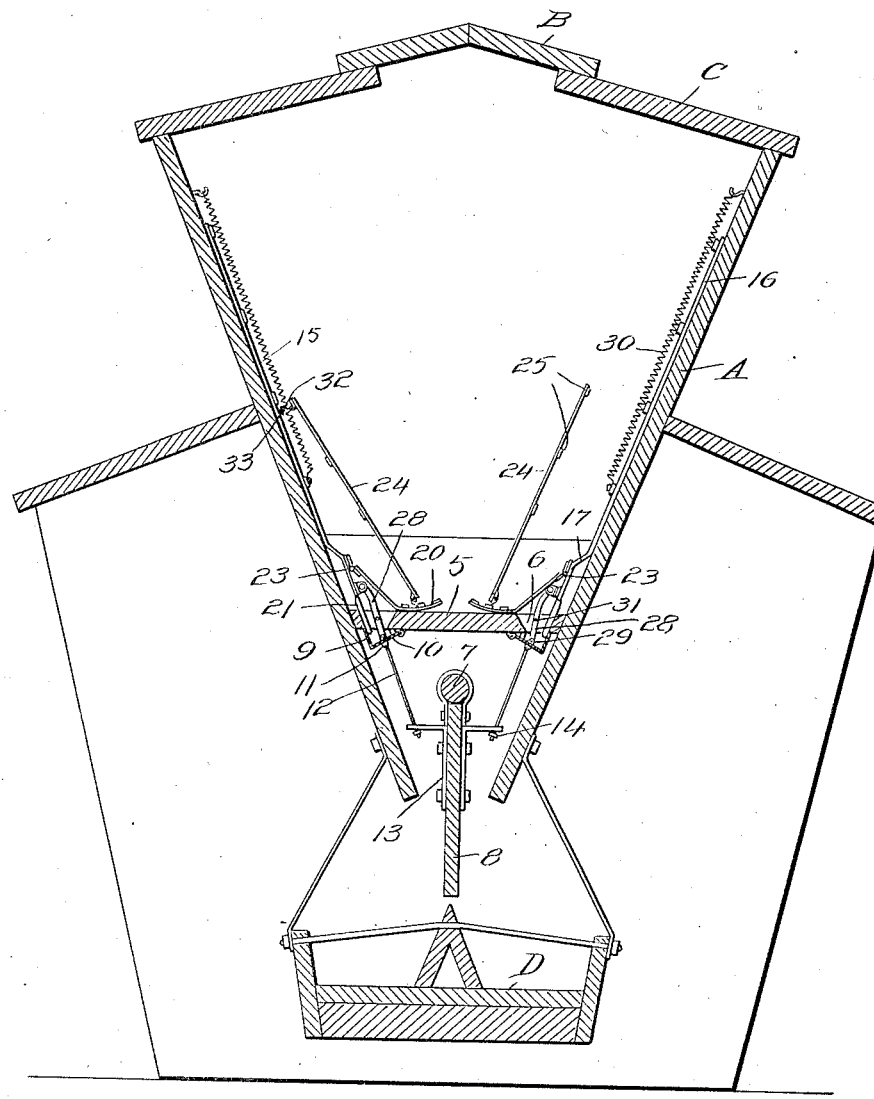

O. W. HINER, D. C. FARNHAM AND E. A. FARNHAM, Jr.
AUTOMATIC ANIMAL FEEDER.
APPLICATION FILED SEPT. 23, 1919.
1,346,027.
Patented July 6, 1920.
2 SHEETS—SHEET 2.
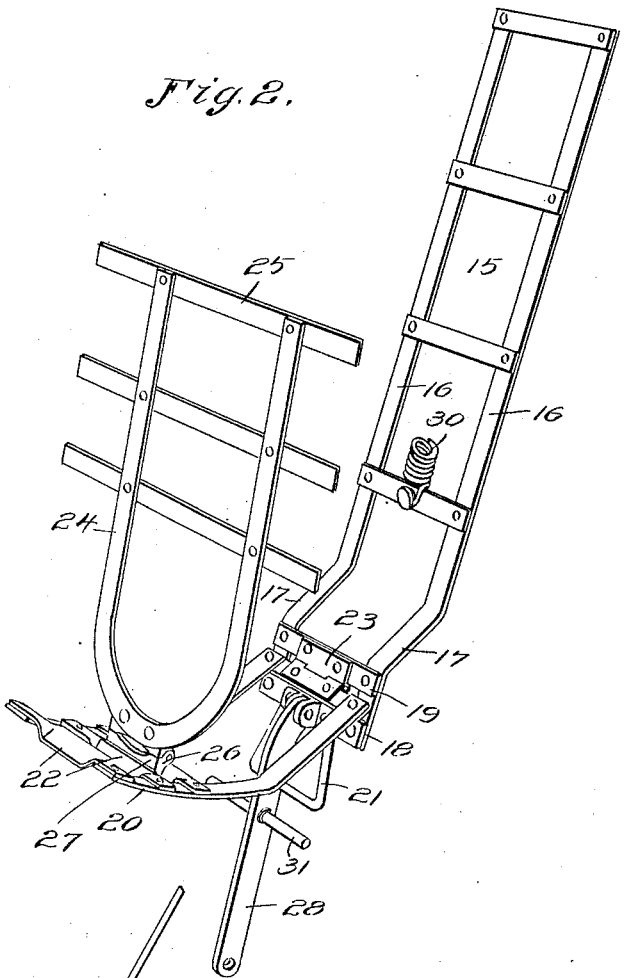
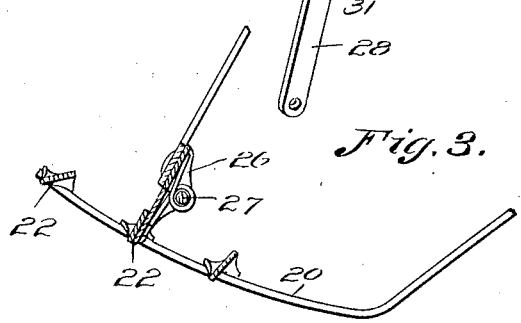

UNITED STATES PATENT OFFICE.

ORA W. HINER, DANA C. FARNHAM, AND ELI A. FARNHAM, JR., OF BUTLER, INDIANA.

AUTOMATIC ANIMAL-FEEDER.

1,346,027.  Specification of Letters Patent.  Patented July 6, 1920.

Application filed September 23, 1919. Serial No. 325,759.

*To all whom it may concern:*

Be it known that we, ORA W. HINER, DANA C. FARNHAM, and ELI A. FARNHAM, Jr., citizens of the United States, residing at Butler, in the county of Dekalb and State of Indiana, have invented certain new and useful Improvements in Automatic Animal-Feeders, of which the following is a specification.

The invention relates to an animal feeder, and more particularly to the class of automatic feeders for live stock.

The primary object of the invention is the provision of a feeder of this character, wherein the container for the feed has arranged therein agitators, which are of novel construction so that the contents of the container will be broken up or disintegrated to assure the positive supply of feed therefrom into a trough arranged beneath said container, the supply of feed being automatically controlled so as to deliver a quantity of feed into the trough at either side thereof in the use of the feeder.

A further object of the invention is the provision of a feeder of this character, wherein a nose board is located immediately above the longitudinal center of the trough from which the feed is consumed by the live stock and has connection with the agitator mechanism interiorly of the feed container so that the stock when rooting in the trough will operate the nose board, the latter in turn actuating the feed control mechanism and the agitator thereby delivering a quantity of feed from the container to the trough at either side of the feeder and at the same time positively agitating the contents of the container to assure the delivery of the feed to the trough.

A still further object of the invention is the provision of a feeder of this character wherein the trough is supplied with feed on the side at which the animal is located, so that the feeder is operable for delivery of feed to the trough automatically and under the control of the animal at that side and at the place only where the animal is located relative to the feeder.

A still further object of the invention is the provision of a feeder of this character which is comparatively simple in construction, thoroughly reliable and efficient in operation, strong, durable, automatic in action, and inexpensive to manufacture and install.

With this and other objects in view, the invention consists in the construction, combination and arrangement of parts as will be hereinafter fully described, illustrated in the accompanying drawings and pointed out in the claims hereunto appended.

In the accompanying drawings:

Figure 1 is a vertical transverse sectional elevation of a feeder constructed in accordance with the invention.

Fig. 2 is a detail perspective view of one of the agitators showing the normal relative positions of its adjunct parts.

Fig. 3 is a fragmentary vertical sectional elevation showing in detail the spring hinge connection of the inner agitator.

Similar reference characters indicate like or corresponding parts throughout the several views of the drawings.

Referring to the drawings in detail A designates a portion of a substantially hopper shaped feed container having a crown roof B provided with removable sections C and below the lower open end of said container A is positioned the feed trough D, the latter and the detailed construction of the container A together with its frame being no part of the present invention and forms the subject matter of a copending application filed by us on or about the 26th day of August, 1919, and serially numbered 319,873.

Arranged within the container A lifted above the lower open end thereof is a horizontally disposed false bottom 5 which has formed therein discharge means 6 on opposite sides of the longitudinal center of said container and through which is delivered feed therefrom to be dropped within the trough D in the operation of the feeder. It is, of course, understood that the container A can be divided into any number of compartments by the arrangement of partitions therein as per the disclosure in the above referred to application for patent.

Located below the false bottom 5 and extended centrally longitudinally of the container A is a horizontally pivoted rod 7 on which is swingingly supported a nose board 8, the latter being located in suspended relation centrally relative to the trough D thereby dividing the latter into feed wells at opposite sides of the nose board so that live stock can be fed from either side of the trough either individually or collectively in a manner presently described.

Suitably secured to the under face of the false bottom at each opening 6 therein is a discharge mouth piece 9 which registers with the opening 6 and hinged to the bottom 5 is a closure 10 for the mouth piece, the closure being formed with a pivot ear 11 depending therefrom to which is pivotally connected a pull link or rod 12 the latter being loosely engaged in a bracket 13 secured to the nose board 8, it being understood of course that pairs of these brackets are secured to opposite sides thereof to coact with the rods 12 connected to the closures 10 for the alternate opening of the latter on the swinging of the nose board. The rods 12 are loosely passed through the pairs of brackets 13 and carry adjusting nuts 14 on their lower end portions to engage with the brackets 13 so that when the nose board 8 is swung in one direction one of the rods 12 will be pulled upon to bring one closure 10 to open position while the other rod will slide through the other bracket 13 thus the other closure 10 being maintained closed thereby controlling the dropping of feed from the container A into the trough D on opposite sides of the nose board 8. The nose board 8 is manipulated by live stock when rooting in the trough D and the pressure of the nose of the live stock upon the board causes the swinging thereof to one side or the other, thus automatically moving the closures 10 which when in closed position retain the feed within the mouth pieces 9 and on the opening of said closures the feed therein will be dropped into the trough for consumption by the live stock.

Arranged within the container A is agitator mechanism comprising a pair of oppositely disposed sliding frames 15, each simulating a ladder having the side bars 16 thereof at their lower ends formed with bights 17 which offset the lower ends 18 of said side bars inwardly from the inner face of the side wall adjacent thereto of the container A and carried by these ends 18 are cross bars 19 to the upper one of which is swingingly connected a rake agitator 20 while fixed to the lower bar 19 is an agitator stirrup in the form of a substantially V-shaped bail 21 adapted to work through the opening 6 and into the mouth piece 9 on movement of the agitator frame 15 for dislodging the feed trapped therein for the dropping of the same into the trough on the opening of the closure 10 while the rake agitator 20 plays crosswise upon the false bottom 5 for dislodging the feed thereon and pushing and pulling same in the direction of the opening 6 therein, the rake agitator 20 being formed with blades 22 which serve to hoe the feed upon the false bottom and displace said feed in the movement thereof. The rake agitator 20 is connected to the bar 19 by a leaf hinge 23 for the free playing movement of the said rake agitator and the frame 16 in a manner presently described.

Mounted upon each of the rake agitators 20 is an inner agitator in the form of a substantially U-shaped bar 24 carrying cross arms or bars 25 secured at intervals to the links of said member 24, the closed end of the member 24 being secured to one of the leaves 26 of a spring hinge 27 the other leaf thereof being secured to one of the blades 22 of said rake agitator and this spring hinge 27 serves to normally dispose the inner agitator 24 in the direction of the center of the container A thereby causing said inner agitator to work against the feed centrally of the container and dislodge or agitate such feed at this point.

Pivotally connected to the agitator frame 15 which is slidably fitted in any suitable manner against the inner face of one side wall of the container A is a link 28 which is also pivoted to a pivot ear 29 on the closure 10 so that in this manner the agitator frame is connected with said closure and is adapted to be coöperative therewith when the latter is moved to open position. Connected to the frame 15 is a coiled retractile spring 30 which is also connected to the side wall of the container A and this spring serves to retract the frame 15 to normal position and also exerts a pulling action upon the closure 10 to bring the same to closed position when the nose board 8 is being swung to central or natural position by its own weight upon the pivot 7 supporting the same.

The link 28 has thereon a cross agitator frame 31 which plays within the opening 6 to avoid any possibility of the choking of feed therein when the agitator mechanism is active.

Carried by each of the inner agitator members 24 is a hook 32 while mounted upon the agitator frame 15 is a suitable keeper 33 for the detachable engagement of the hook therein to hold the inner agitator member 24 in a position so as to not interfere with the filling of the container A with feed, which latter is introduced through the top thereof on the removal of the sections C of the roof and whereby the members 24 when closed will play upon the feed for constantly agitating the same at the center of the container when the agitator mechanism is in operation.

In the operation of the feeder when an animal approaches the same and seeks feed from the trough D it will root within the trough and in so doing exerts pressure upon the nose board 8 causing the latter to swing away from the side on which the animal is located. In this movement of the nose board, the closure 10 on that side of the animal will be pulled to open position thereby permitting the feed within the container A to drop through the opening 6 and mouth piece 9 into the trough on the side thereof at which the animal is standing. On the opening of the closure 10 the agitator frame 16 is lowered so as to stir the feed within the container A at the sides thereof. Simultaneously with the movement of the agitator frame 15 the rake agitator 20 is moved upon the false bottom 5 dislodging the feed packed against the same and also the inner agitator member 24 will disturb the feed centrally of the same so that the feed will not pack or become solidified within said container but will precipitate toward the feed opening 6 and drop therefrom into the trough D in quantities varying according to the extent of time the closure 10 is open for consumption by the animal from the trough. The other closure 10 during the swinging of the nose board is undisturbed and likewise the agitator mechanism connected therewith so that no feed will be delivered into the trough on the other side from that at which the animal is positioned, thereby avoiding waste of feed and supplying the requisite quantity for consumption by the animal operating the nose board and only on that side at which the animal is located.

It will be clearly apparent that the feed within the container A is thoroughly agitated and thus a positive distribution of the feed therefrom is assured for the feeding of animals individually and only to those animals actuating the nose board 8 when positioned at either side of the trough, thereby avoiding the waste of feed or the excessive accumulation of the same within the trough.

It is contemplated that minor changes, variations and modifications may be resorted to in the invention as fall properly within the scope of the appended claims, without departing from the spirit of the invention or sacrificing any of its advantages.

From the foregoing it is thought that the construction and manner of operation of the feeder will be clearly understood and therefore a more extended explanation has been omitted.

What is claimed is:

1. In a feeder of the character described, a trough accessible at opposite sides thereof, a feed container above the trough and open at its lower end, a nose board swingingly supported in the open end of the container immediately above the trough, a false bottom within the container and having discharge openings therein, mouth pieces depending from the false bottom at the discharge opening, swinging closures for said mouth pieces, agitator frames slidably fitted in the container at opposite sides thereof and having extensions working through the discharge openings, connections between the closures and said frames, rake agitators swingingly connected to the frames and movable upon the false bottom, inner agitator members rising from the rake agitators and yieldably supported thereby and connections between the nose board and said closures for permitting alternate opening of said closures on swinging movement of the nose board.

2. In a feeder of the character described, a trough accessible at opposite sides thereof, a feed container above the trough and open at its lower end, a nose board swingingly supported in the open end of the container immediately above the trough, a false bottom within the container and having discharge openings therein, mouth pieces depending from the false bottom at the discharge opening, swinging closures for said mouth pieces, agitator frames slidably fitted in the container at opposite sides thereof and having extensions working through the discharge openings, connections between the closures and said frames, rake agitators swingingly connected to the frames and movable upon the false bottom, inner agitator members rising from the rake agitators and yieldably supported thereby, connections between the nose board and said closures for permitting alternate opening of said closures on swinging movement of the nose board, and means for tensioning the said agitator frames.

3. In a feeder of the character described, a trough accessible at opposite sides thereof, a feed container above the trough and open at its lower end, a nose board swingingly supported in the open end of the container immediately above the trough, a false bottom within the container and having discharge openings therein, mouth pieces depending from the false bottom at the discharge opening, swinging closures for said mouth pieces, agitator frames slidably fitted in the container at opposite sides thereof and having extensions working through the discharge openings, connections between the closures and said frames, rake agitators swingingly connected to the frames and movable upon the false bottom, inner agitator members rising from the rake agitators and yieldably supported thereby, connections between the nose board and said closures for permitting alternate opening of said closures on swinging movement of the nose board, means for tensioning the said agitator frames, and agitator arms on the connections between the closures and the agitator frames and working within the discharge openings.

4. In a feeder of the character described, a trough accessible at opposite sides thereof, a feed container above the trough and open at its lower end, a nose board swingingly supported in the open end of the container immediately above the trough, a false bottom within the container and having discharge openings therein, mouth pieces depending from the false bottom at the discharge opening, swinging closures for said mouth pieces, agitator frames slidably fitted in the container at opposite sides thereof and having extensions working through the discharge openings, connections between the closures and said frames, rake agitators swingingly connected to the frames and movable upon the false bottom, inner agitator members rising from the rake agitators and yieldably supported thereby, connections between the nose board and said closures for permitting alternate opening of said closures on swinging movement of the nose board, means for tensioning the said agitator frames, agitator arms on the connections between the closures and the agitator frames and working within the discharge openings, and means for detachably fastening the inner agitator frames to the first named frames.

5. In a feeder of the character described, superposed feed container and trough, said container having an opening in its lower end for the delivery of feed therefrom into the trough, a nose board swingingly mounted centrally relative to the trough for directing the food at either side of the trough, a false bottom located within the container above the nose board and having discharge openings, closure members for said discharge openings, connections between the nose board and said closure members for permitting alternate opening of said closure members on the swinging of the nose board, and agitator mechanism arranged within the container and operative on the opening and closing of the closure members.

6. In a feeder of the character described, superposed feed container and trough, said container having an opening in its lower end for the delivery of feed therefrom into the trough, a nose board swingingly mounted centrally relative to the trough for directing the food at either side of the trough, a false bottom located within the container above the nose board and having discharge openings, closure members for said discharge openings, connections between the nose board and said closure members for permitting alternate opening of said closure members on the swinging of the nose board, and agitator mechanism arranged within the container and operative on the opening and closing of the closure members, said agitator mechanism including slidable frames having swinging rake frames connected therewith.

7. In a feeder of the character described, superposed feed container and trough, said container having an opening in its lower end for the delivery of feed therefrom into the trough, a nose board swingingly mounted centrally relative to the trough for directing the food at either side of the trough, a false bottom located within the container above the nose board and having discharge openings, closure members for said discharge openings, connections between the nose board and said closure members for permitting alternate opening of said closure members on the swinging of the nose board, agitator mechanism arranged within the container and operative on the opening and closing of the closure members, said agitator mechanism including slidable frames having swinging rake frames connected therewith, and means for tensioning the sliding arms and adapted to normally sustain the closure members in closed position.

8. In a feeder of the character described, superposed feed container and trough, said container having an opening in its lower end for the delivery of feed therefrom into the trough, a nose board swingingly mounted centrally relative to the trough for directing the food at either side of the trough, a false bottom located within the container above the nose board and having discharge openings, closure members for said discharge openings, connections between the nose board and said closure members for permitting alternate opening of said closure members on the swinging of the nose board, agitator mechanism arranged within the container and operative on the opening and closing of the closure members, said agitator mechanism including slidable frames having swinging rake frames connected therewith, means for tensioning the sliding arms and adapted to normally sustain the closure members in closed position, inner agitator members on the rake agitators and spring hinges connecting the inner agitator members to said rake agitators.

In testimony whereof, we affix our signatures hereto.

ORA W. HINER.
DANA C. FARNHAM.
ELI A. FARNHAM, Jr.